United States Patent
Princen et al.

(10) Patent No.: US 9,801,051 B2
(45) Date of Patent: *Oct. 24, 2017

(54) CLOUD SERVICE FOR MAKING SOCIAL CONNECTIONS

(71) Applicant: ACER INCORPORATED, New Taipei (TW)

(72) Inventors: John Princen, Cupertino, CA (US); Raymond Lo, Mountain View, CA (US)

(73) Assignee: ACER INCORPORATED, New Taipei (TW)

( * ) Notice: Subject to any disclaimer, the term of this patent is extended or adjusted under 35 U.S.C. 154(b) by 152 days.

This patent is subject to a terminal disclaimer.

(21) Appl. No.: 15/144,831

(22) Filed: May 3, 2016

(65) Prior Publication Data

US 2016/0249207 A1    Aug. 25, 2016

Related U.S. Application Data

(62) Division of application No. 13/781,769, filed on Mar. 1, 2013.

(Continued)

(51) Int. Cl.
| | |
|---|---|
| *H04B 5/00* | (2006.01) |
| *H04W 12/02* | (2009.01) |
| *H04W 8/00* | (2009.01) |
| *H04W 4/00* | (2009.01) |
| *H04W 4/20* | (2009.01) |
| *H04L 29/06* | (2006.01) |
| *G06Q 50/00* | (2012.01) |
| *H04W 8/20* | (2009.01) |

(52) U.S. Cl.
CPC ............ *H04W 12/02* (2013.01); *G06Q 50/01* (2013.01); *H04L 63/0407* (2013.01); *H04W 4/008* (2013.01); *H04W 4/206* (2013.01); *H04W 8/005* (2013.01); *H04W 8/20* (2013.01)

(58) Field of Classification Search
CPC   G06Q 50/01; G07F 7/08; G06F 21/31; G06F 21/34; G06F 21/73; G06F 2221/2129; G06F 3/1285; H04L 63/0823; H04L 9/3234; H04L 9/3263; H04W 4/008; H04W 12/06; H04W 12/08; H04N 21/43637
USPC ...................... 455/41.1, 41.2, 41.3
See application file for complete search history.

(56) References Cited

U.S. PATENT DOCUMENTS

| | | | | |
|---|---|---|---|---|
| 2002/0184307 | A1* | 12/2002 | Pineau | G06F 3/1292 709/203 |
| 2004/0125011 | A1* | 7/2004 | Kumon | G01S 13/345 342/70 |

(Continued)

*Primary Examiner* — Edward Urban
*Assistant Examiner* — Max Mathew
(74) *Attorney, Agent, or Firm* — Winston Hsu

(57) ABSTRACT

A cloud service for making social connections includes a remote computer storing user accounts, each account including user information and an anonymous ID bound to the user information. A first mobile device transmits an anonymous ID using a limited range wireless signal module and a second mobile device receives the anonymous ID using a limited range wireless signal module of the second mobile device. The second mobile device transmits the received anonymous ID to a remote computer using an Internet connection module and receives the user information bound to the anonymous ID from the remote computer.

5 Claims, 5 Drawing Sheets

Related U.S. Application Data

(60) Provisional application No. 61/729,270, filed on Nov. 21, 2012.

(56) References Cited

U.S. PATENT DOCUMENTS

| | | | | |
|---|---|---|---|---|
| 2005/0198029 | A1* | 9/2005 | Pohja | H04M 1/7253 |
| 2007/0197261 | A1* | 8/2007 | Humbel | G06Q 30/00 |
| | | | | 455/558 |
| 2008/0079573 | A1* | 4/2008 | Bloebaum | G06F 17/30876 |
| | | | | 340/568.1 |
| 2009/0300168 | A1* | 12/2009 | Guo | G06F 21/73 |
| | | | | 709/224 |
| 2012/0178367 | A1* | 7/2012 | Matsumoto | G06K 19/0707 |
| | | | | 455/41.1 |
| 2013/0054464 | A1* | 2/2013 | Lee | H04B 5/0031 |
| | | | | 705/44 |
| 2013/0095751 | A1* | 4/2013 | Kasslin | H04W 12/12 |
| | | | | 455/41.1 |
| 2013/0095753 | A1* | 4/2013 | Chen | H04B 5/00 |
| | | | | 455/41.1 |
| 2013/0189925 | A1* | 7/2013 | Staskawicz | H04B 7/24 |
| | | | | 455/41.1 |
| 2013/0344804 | A1* | 12/2013 | Chen | H04B 5/02 |
| | | | | 455/41.1 |
| 2014/0141720 | A1* | 5/2014 | Princen | H04L 63/0407 |
| | | | | 455/41.2 |
| 2014/0162598 | A1* | 6/2014 | Villa-Real | H04M 1/66 |
| | | | | 455/411 |
| 2016/0099963 | A1* | 4/2016 | Mahaffey | H04L 63/1433 |
| | | | | 726/25 |

\* cited by examiner

CLOUD SERVICE FOR MAKING SOCIAL CONNECTIONS

CROSS REFERENCE TO RELATED APPLICATIONS

This is a division of U.S. patent application Ser. No. 13/781,769, filed Mar. 1, 2013, which claims priority to U.S. Provisional Application No. 61/729,270, filed Nov. 21, 2012, and both U.S. patent application Ser. No. 13/781,769 and U.S. Provisional Application No. 61/729,270 are incorporated herein by reference in their entireties for all intents and purposes.

BACKGROUND OF THE INVENTION

1. Field of the Invention

This disclosure relates to simplification of making social connections, and more specifically to the making of social connections using mobile devices having limited range wireless signal modules and access to a remote computer.

2. Description of the Prior Art

People carry cell-phones, and other wireless capable devices with them everywhere. However, it remains a problem to easily share information with users who are geographically local (e.g. in the same room, or within a short distance of each other outside), since it is not possible to identify those users and their devices. The following invention addresses this problem specifically and provides a way for users with wireless devices to identify each other, with associated privacy controls, and subsequently take action to share information.

SUMMARY OF THE INVENTION

A cloud service for making social connections includes a remote computer storing user accounts, each user account having user provided information and an anonymous ID bound to the user information. A first mobile device transmits the respective anonymous ID bound to their account using a limited range wireless signal module of the first mobile device. A second mobile device receives the transmitted anonymous ID via a limited range wireless signal module of the second mobile device, transmits the received anonymous ID to a remote computer using an Internet connection module of the second mobile device, and receives the user information bound to the anonymous ID from the remote computer.

The disclosure further includes a mobile device having an internet connection module, a limited range wireless signal module, a central processing unit, and a memory. The memory includes computer codes, which when executed by the central processing unit, causes the mobile device to receive an anonymous ID via the limited range wireless signal module, transmit the received anonymous ID to a remote computer using the Internet connection module, and receive user information bound to the anonymous ID from the remote computer.

The disclosure further includes a method of making social connections that includes a first mobile device transmitting an anonymous ID using a limited range wireless signal module of the first mobile device. A second mobile device receives the anonymous ID via a limited range wireless signal module of the second mobile device and transmits the received anonymous ID to a cloud service using an Internet connection. The cloud service responds by transmitting information for an account, providing information bound to the anonymous ID to the second mobile device.

These and other objectives of the present invention will no doubt become obvious to those of ordinary skill in the art after reading the following detailed description of the preferred embodiment that is illustrated in the various figures and drawings.

DETAILED DESCRIPTION

All wireless signals have a useful range that is limited by the transmission power, antenna type, the location and/or the environments in which they are used. However, for the purposes of this disclosure, the phrase "limited range wireless signal" is intended to mean a wireless signal that is generally intended to have a relatively short limited geographical range of useful signal strength relative to the source of the wireless signal. Useful signal strength would normally be determined by sensitivities of the mobile devices being used to transmit and receive the limited range signals. Some examples of such a limited range wireless signal protocols include, inter alia, WI-FI and Bluetooth. The phrase "Internet connection" is intended to mean any kind of connection that provides access to the Internet, and may be wired and/or wireless including cellular technologies, and/or may also make use of local or wide area networks when appropriate. Some examples of such an "Internet connection" include, inter alia, a physical cable to a network or access point, a WI-FI connection to a network or access point, and/or a connection using cellular technologies to a network, access point, or base station.

A cloud service, which may be hosted by a remote computer, is accessible via an Internet connection and is configured to store user accounts. Each user account records the user's identity, a substantially unique anonymous ID (identification) associated with that user and/or account, and other ancillary information depending on the application. The cloud service binds the anonymous ID with the account and the information therein.

When users of two mobile devices are physically located within a same geographical area defined by the useful range of their respective limited range wireless signals, they can use the limited range wireless signal to make an initial introduction so that information stored in the cloud service by the user of the other mobile device can be accessed, subject to privacy setting determined by the other user.

Figure 2:
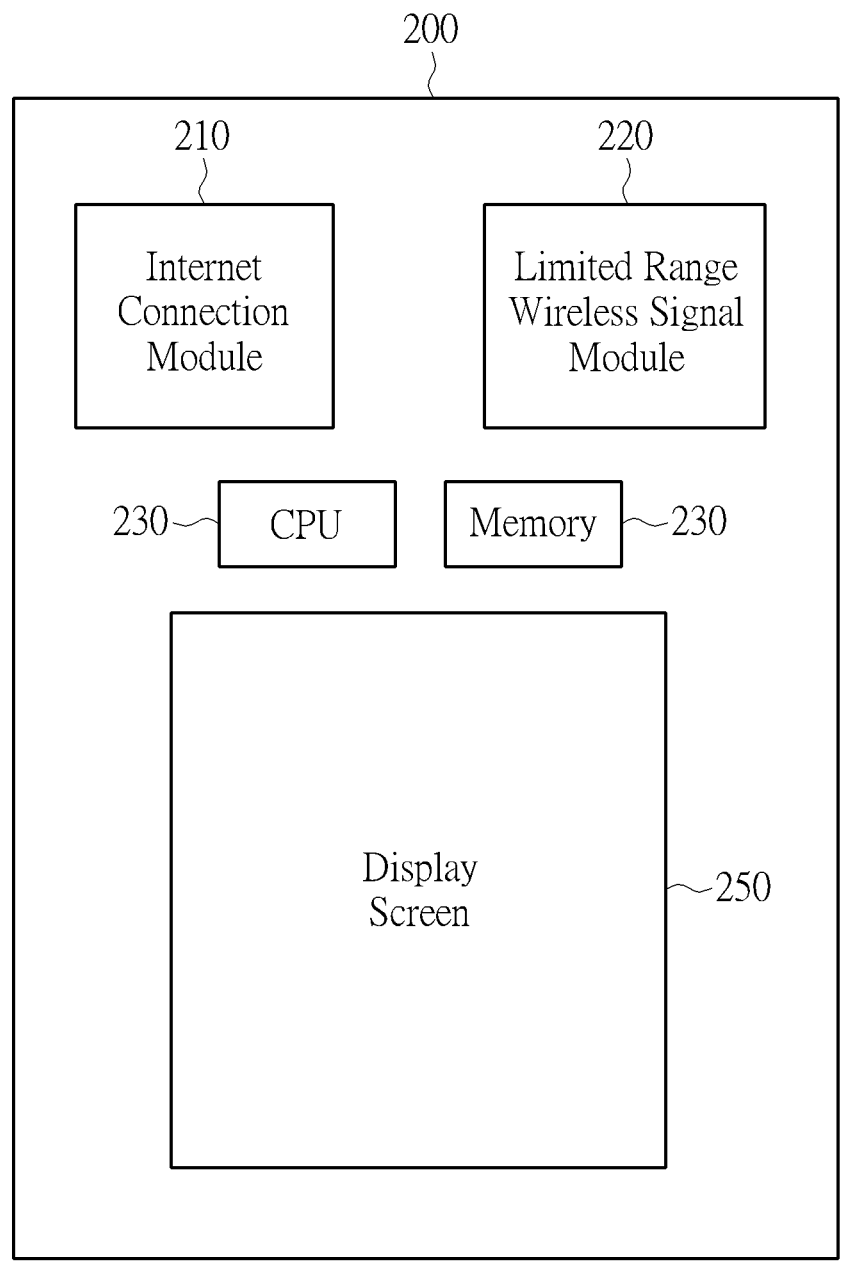
FIG. 2 is a block diagram of a mobile device according to an embodiment of the invention.

Please refer to FIG. 2. Each of the mobile devices 200 comprises a limited range wireless signal module 220, an Internet connection module 210, and may include a central processing unit (CPU) 230, a memory 230, a display screen 250, and also all necessary connections required between the elements to allow their proper functioning. The memory 230 may comprise computer codes, which when executed by the CPU 230, cause the mobile device 200 to perform the functions described herein. The Internet connection module 210 and the limited range wireless module 220 may, in some embodiments, be unified into a single transceiver according to design requirements. Furthermore, the Internet connection module 210 and the limited range wireless module 220 may comprise hardware required to function as a transceiver or communications port, such as an antenna, amplifiers, and/or physical connectors.

Figure 1:
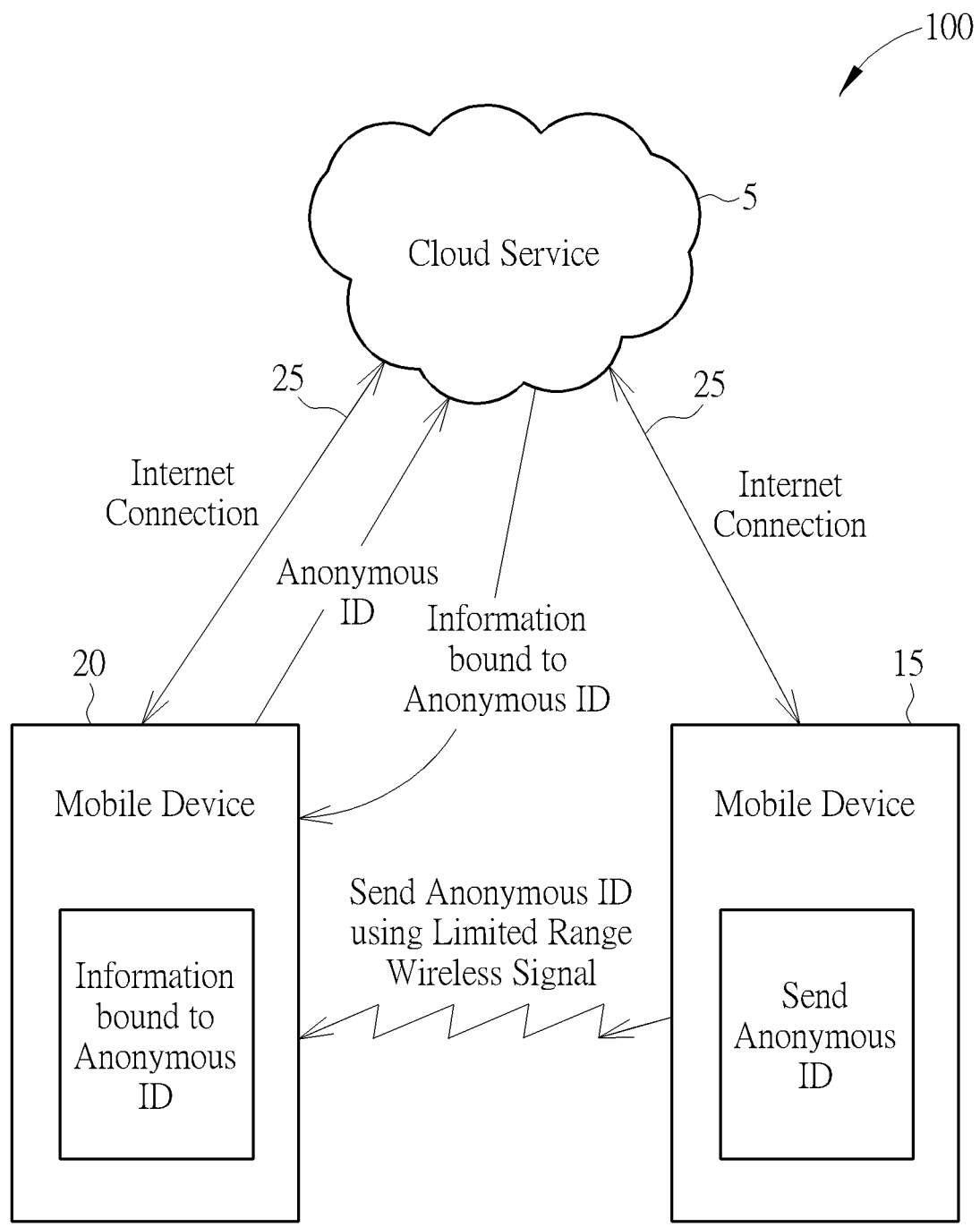
FIG. 1 is a conceptual diagram of an embodiment of the invention.

Now, please refer back to FIG. 1 which shows a conceptual diagram of a cloud service 100. Two users, each having a mobile device 15, 20, are within the useful range of each other's limited wireless signal. Each of the two users has an account with the cloud service 100, so each of the two users also has an anonymous ID associated with their respective accounts. The cloud service 100 binds the information associated with the account to the anonymous ID.

A first user of a first mobile device 15 transmits their anonymous ID using the limited range wireless module 220 of their mobile device 15.

A second mobile device 20 receives, via the limited range wireless module 220 of their mobile device 20 only when within range of the limited range signal of the transmitting first mobile device 15, the anonymous ID transmitted by the first mobile device 15. The second mobile device 20 to transmits the received anonymous ID to the cloud service 100 via the Internet connection module 210 of the second mobile device 20, under control of the user, or the second mobile device can automatically transmit the received anonymous ID to the cloud service 100 via the Internet connection module 210 of the second mobile device 20 in some embodiments. The cloud service 100 then transmits the information bound to the anonymous ID to the second mobile device 20 subject to the privacy settings for the information associated with the account. The received information maybe displayed on the display screen 250 of the second mobile device 20.

It is worthy of noting that the cloud service 100 is not limited to only two mobile devices 15, 20. In other words, more than two mobile devices 200 may be transmitting their respective anonymous IDs at any given time, some or all of which may be received also by a plurality of mobile devices 200. As long as the mobile devices are physically located within the useful range of the limited range wireless signals of their devices, the mobile devices 200 may receive a transmitted anonymous ID. For example, in a meeting room, perhaps six mobile devices 200 may each be transmitting their user's anonymous IDs, and each of the six mobile devices 200 may receive the anonymous IDs transmitted by the other 5 mobile devices, providing the respective users an opportunity to access the cloud service 100 and obtain information about the user of one or more of the received anonymous IDs, according to their desire. Of course, six mobile devices 200 is merely an example and any number of mobile devices 200 greater than one will provide the same opportunity.

It is also worthy of noting that a user of the cloud service 100 may want to limit what information associated to their account is available to different recipients of their anonymous ID. Here the cloud service 100 can provide a distinct advantage over peer-to-peer sharing of information, say via the use of WI-FI Direct, because the cloud service 100 can provide the user with layers of privacy controls and setting which are set up for the account. For example, the user may wish to have only a public profile available to anyone who transmits their anonymous ID to the cloud service 100, but is willing to provide photos of their recent vacation to a select group of friends similarly to what can be done on some social networking websites through privacy settings. Another advantage the cloud service 100 holds over those same social networking sites is the simplified manor in which the initial contact is made. Please note that mobile devices can simultaneously be broadcasters and recipients.

Figure 3:
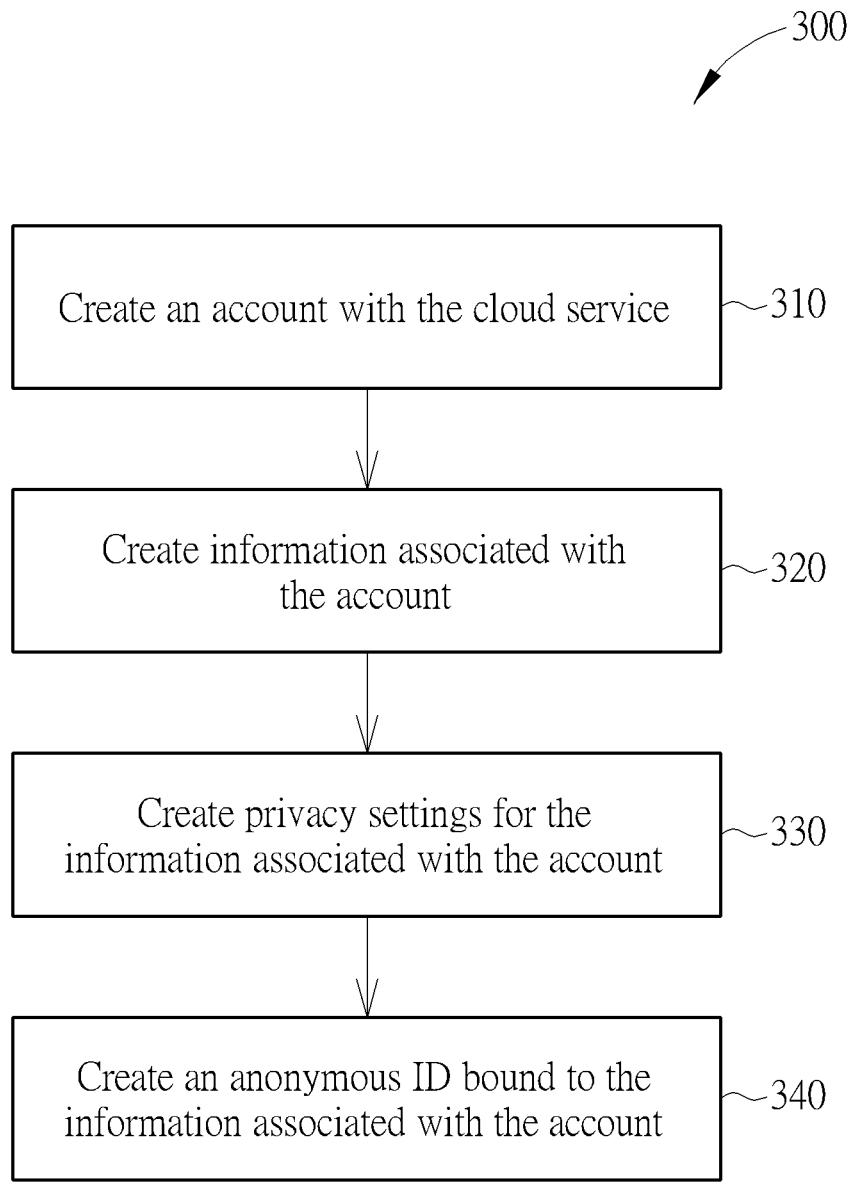
FIG. 3 is a flow chart of binding an anonymous ID to information associated with an account with the cloud service.

Please refer now to FIG. 3, which is a flow chart of binding an anonymous ID to information associated with an account with the cloud service 100. Although step 330 concerning privacy setting of the flow chart 300 is preferred, step 300 may be omitted from the method according to design considerations. Method 300 may contain the following steps:

Step 310: Create an account with the cloud service 100.
Step 320: Create information associated with the account. This information is stored in the cloud service.
Step 330: (Optionally) create privacy settings for the information associated with the account. Normally, these privacy settings may be set by the user for their account via an Internet connection with the cloud service.
Step 340: Create an anonymous ID bound to the information associated with the account. The anonymous ID may be assigned by the cloud service, by the mobile device software, or created by the user. The anonymous ID also may be permanent or changeable according to design considerations.

Figure 4:
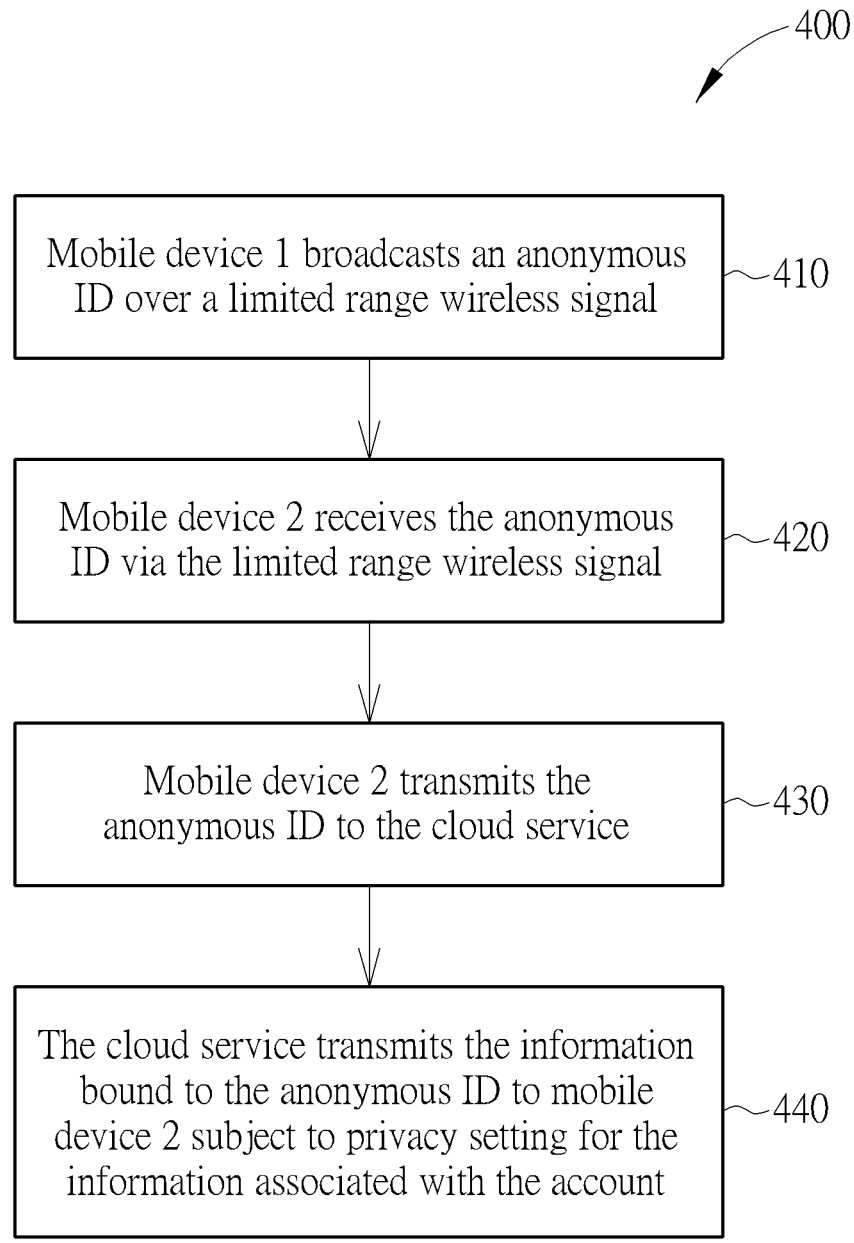
FIG. 4 is a flow chart illustrating sharing information between mobile devices according to an embodiment of the invention.

Please refer now to FIG. 4, which is a flow chart illustrating sharing information between mobile devices according to an embodiment of the invention. Method 400 may contain the following steps:

Step 410: Mobile device 1 broadcasts an anonymous ID using the limited range wireless signal module of the mobile device 1.
Step 420: Mobile device 2 receives the anonymous ID via the limited range wireless signal module of the mobile device 2.
Step 430: Mobile device 2 transmits the received anonymous ID to the cloud service using the Internet connection module of the mobile device 2.
Step 440: The cloud service transmits the information bound to the anonymous ID to the mobile device 2, subject to any privacy settings, if present, for the account providing the information bound to the anonymous ID.

Figure 5:
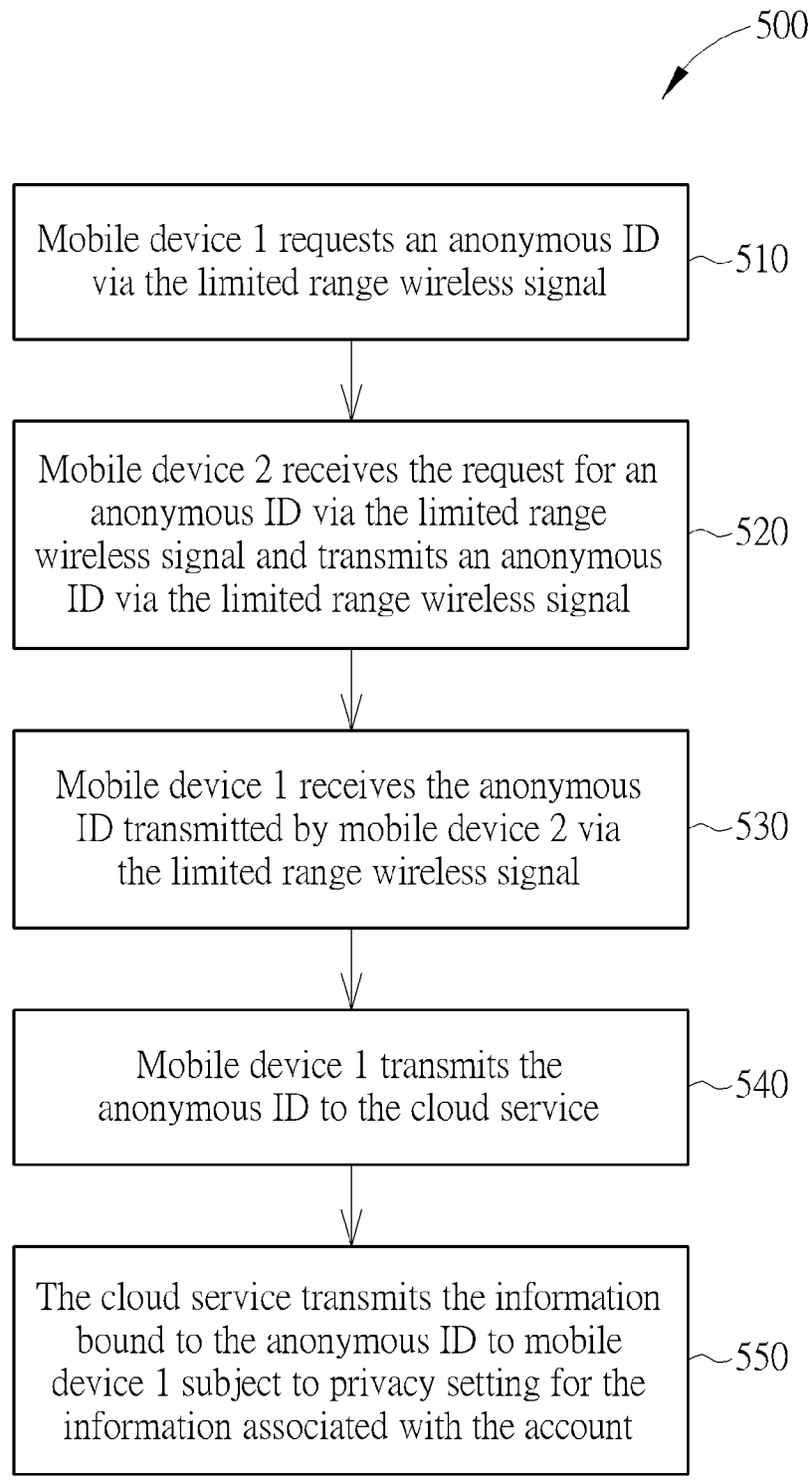
FIG. 5 is a flow chart illustrating sharing information between mobile devices according to another embodiment of the invention.

Please refer now to FIG. 5, which is a flow chart illustrating sharing information between mobile devices according to another embodiment of the invention. Method 500 may contain the following steps:

Step 510: Mobile device 1 requests an anonymous ID using the limited range wireless signal module of the mobile device 1.
Step 520: Mobile device 2 receives the request for an anonymous ID via the limited range wireless signal module of the mobile device 2. Mobile device 2 may transmit an anonymous ID associated with the user of the mobile device 2 via the limited range wireless signal module of the mobile device 2.
Step 530: Mobile device 1 receives the anonymous ID transmitted by the limited range wireless signal module of the mobile device 2.
Step 540: Mobile device 1 transmits the received anonymous ID to the cloud service using the Internet connection module of the mobile device 1.
Step 550: The cloud service transmits the information bound to the anonymous ID to the mobile device 1, subject to any privacy settings, if present, for the account providing the information bound to the anonymous ID.

A difference between the method 400 and the method 500 is that the mobile device 2 may not transmit the anonymous ID until after a request for an anonymous ID has been received.

After a mobile device 200 has received the information bound to the anonymous ID from the cloud service 100, the user of the mobile device 200 can then optionally request certain actions such as:
1. Send a message through the cloud service 100.
2. Request to set up a secure local link to the mobile device 200 that was the source of the transmitted anonymous ID to transfer information.
3. Request the cloud service 100 to link the user associated with the anonymous ID as a "friend" in their account.

For at least cases 2 and 3 above, the user of the mobile device 200 that was the source of the transmitted anonymous ID could be given the option to accept or deny the request.

The user of the mobile device 200 that was the source of the transmitted anonymous ID can, in some embodiments, request the cloud service 100 to limit which other users can receive information about their identity, and can request actions. For example, it can be useful to limit access to other users who are existing friends or connections of the user on other social networking sites (e.g. Facebook, LinkedIn). This, as well as many of the further refinements below, may be implemented according to privacy settings for the account of the transmitted anonymous ID.

As a further refinement, the user of the mobile device 200 that was the source of the transmitted anonymous ID can request the cloud service 100 to only release certain information to users. For example, the cloud service could provide limited information such as gender, a picture or avatar, but not release the real identity of the user associated with the anonymous ID.

As a further refinement, the user of the mobile device 200 that was the source of the transmitted anonymous ID, in some embodiments, can request the cloud service 100 to limit what actions the recipient user can take. For example the user of the mobile device 200 that was the source of the transmitted anonymous ID may not permit any friend requests.

As a further refinement, the user of the mobile device 200 that was the source of the transmitted anonymous ID, in some embodiments, can request the cloud service to release different information to different classes of recipients. For example, existing friends may receive more complete information, while unknown recipients of the anonymous ID might receive limited information.

As a further refinement, in some embodiments, the cloud service 100 can connect to other cloud services linked to other ID's the user of the mobile device 200 that was the source of the transmitted anonymous ID, and allow a recipient of the anonymous ID to view information from those cloud services. For example, the service could connect to Facebook, and provide information from the source user's Facebook account to the recipients.

As a further refinement, in some embodiments, the user of the mobile device 200 that was the source of the transmitted anonymous ID can request the cloud service 100 to limit visibility of the user's information to a specific range of times, such as only between specific times of day, or only for a specific period of time.

As a further refinement, in some embodiments, the user of the mobile device 200 that source of the transmitted anonymous ID can request the cloud service to limit visibility of their user's information to a specific geographic location. For example, the user may only want their information visible when they at work.

As a further refinement, in some embodiments, the user of the mobile device 200 that was the source of the transmitted anonymous ID can optionally control the transmit power setting, which will determine the local area in which the anonymous ID can be received.

As a further refinement, in some embodiments, the users of the mobile devices 15, 20 automatically share information with the group that is "local" and connected. Groups can be defined through a social networking service.

It is also possible to combine various privacy control limits into a compound limit. For example, visibility can be limited to a time and place.

Any combination of these embodiments may or may not be combined in any fashion without departing from the intended scope of the invention.

In summary, the present disclosure includes transmission of an anonymous ID by a limited range wireless module of first mobile device, the reception of the anonymous ID by a second mobile device, and an Internet connection module of the second mobile device sending the anonymous ID to a cloud service, which then sends information about the user of the first mobile device to the second mobile device. This simplified social connection method allows users of mobile devices who are geographically local to easily share information with other users.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A mobile device comprising:
an internet connection module;
a limited range wireless signal module;
a central processing unit; and
a memory comprising computer code, which when executed by the central processing unit, causes the mobile device to receive a first anonymous ID via the limited range wireless signal module, transmit the received first anonymous ID to a remote computer using the Internet connection module, and receive user information corresponding to an account bound to the first anonymous ID from the remote computer according to a privacy setting of the account already set in the remote computer before the anonymous ID is received by the mobile device, the privacy setting being used to set an amount of the user information corresponding to the account allowed to be accessed by the mobile device;
wherein the user information corresponding to the account is stored in the remote computer before the mobile device transmits the received anonymous ID to the remote computer.

2. The mobile device of claim 1 wherein the memory further comprises computer code, which when executed by the central processing unit, causes the mobile device to set privacy settings and the remote computer is configured to transmit the user information bound to the anonymous ID according to the privacy settings.

3. The mobile device of claim 1 wherein the memory further comprises computer code, which when executed by the central processing unit, causes the mobile device to receive the first anonymous ID when broadcasted by a limited range wireless signal.

4. The mobile device of claim 1 wherein the memory further comprises computer code, which when executed by the central processing unit, causes the mobile device to transmit, using the limited range wireless signal module of the mobile device, a request for the anonymous ID.

5. The mobile device of claim 1 wherein the memory further comprises computer code, which when executed by the central processing unit, causes the mobile device to receive the anonymous ID via the limited range wireless signal module of the mobile device only when within range of a limited range wireless signal of a transmitting device.

* * * * *